United States Patent
Maryniak et al.

(10) Patent No.: US 11,269,564 B1
(45) Date of Patent: Mar. 8, 2022

(54) PROCESSING-INDEPENDENT TABLET INTERFACE FOR PRINTING DEVICES

(71) Applicant: Xerox Corporation, Norwalk, CT (US)

(72) Inventors: James M. Maryniak, Webster, NY (US); Rui M. Amorim, Fairport, NY (US); Brian M. Carpenter, Rochester, NY (US); Timothy J. Kelley, Pittsford, NY (US); Kathleen M. Johnson, Rochester, NY (US); Yelena Shapiro, Webster, NY (US); Louis P. De Souza, Victor, NY (US); James Miles, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/010,888

(22) Filed: Sep. 3, 2020

(51) Int. Cl.
*G06F 3/12* (2006.01)
*H04N 5/225* (2006.01)
*G06F 3/041* (2006.01)

(52) U.S. Cl.
CPC ............ *G06F 3/1203* (2013.01); *G06F 3/122* (2013.01); *G06F 3/1236* (2013.01); *G06F 3/1293* (2013.01); *G06F 3/041* (2013.01); *H04N 5/2257* (2013.01)

(58) Field of Classification Search
None
See application file for complete search history.

(56) References Cited

U.S. PATENT DOCUMENTS

| | | | |
|---|---|---|---|
| 7,911,626 B2 | 3/2011 | Ferlitsch | |
| 8,051,308 B2 | 11/2011 | Hsieh | |
| 8,482,556 B2 * | 7/2013 | Meunier | G03G 15/5016 345/419 |
| 8,773,850 B2 * | 7/2014 | Minaguchi | G06F 1/1626 361/679.44 |
| 8,810,824 B2 | 8/2014 | Takahashi | |
| 8,913,380 B2 * | 12/2014 | Enomoto | G06F 1/1632 361/679.41 |
| 9,342,264 B2 | 5/2016 | Takasu et al. | |
| 10,089,615 B2 | 10/2018 | Edwards et al. | |
| 10,599,445 B2 | 3/2020 | Trethewey | |
| 2009/0066644 A1 * | 3/2009 | Endoh | G03G 15/502 345/157 |
| 2010/0289747 A1 * | 11/2010 | Lee | G06F 3/0233 345/168 |
| 2012/0062943 A1 | 3/2012 | Maeda | |
| 2012/0206766 A1 * | 8/2012 | Suzuki | G06F 3/1254 358/1.15 |
| 2015/0022855 A1 * | 1/2015 | Nakamura | G06K 15/005 358/1.15 |
| 2015/0036283 A1 * | 2/2015 | Suckle | G06F 1/1632 361/679.43 |

(Continued)

*Primary Examiner* — Henok Shiferaw
(74) *Attorney, Agent, or Firm* — Gibb & Riley, LLC (57) ABSTRACT

Printing devices include a printer power supply, a printer processor connected to the printer power supply, printing components connected to the printer power supply and the printer processor, and a tablet interface device connected to the printer processor and the printer power supply. The tablet interface device includes a tablet processor, a USB connection electrically connected to the tablet processor and the printer power supply, and a touchscreen surface electrically connected to the tablet processor. The tablet processor is adapted to operate independently of the printer processor.

17 Claims, 4 Drawing Sheets

(56) References Cited

U.S. PATENT DOCUMENTS

| | | |
|---|---|---|
| 2015/0220255 A1 | 8/2015 | Maeda |
| 2017/0060186 A1* | 3/2017 | Eliyahu ................. G06F 1/1632 |
| 2017/0221035 A1* | 8/2017 | Edwards ............. G06Q 20/202 |
| 2017/0264093 A1* | 9/2017 | Okizaki ................. G03G 15/80 |

* cited by examiner

PROCESSING-INDEPENDENT TABLET INTERFACE FOR PRINTING DEVICES

BACKGROUND

Systems and methods herein generally relate to printing devices and more particularly to interfaces for such devices.

Highly complex machines, such as modern multi-function printing devices (MFDs) can take years to develop because of the specialized and complex functions they perform. One constant challenge is to make MFDs as user-friendly as possible and this is especially difficult because of the time lag between design and final product production. Often MFDs have a user interface with a high-quality display screen that is capable of receiving touch input directly (e.g., touchscreen) or accompanying keyboard and/or buttons.

The menus that are displayed on the user interface are generated by the printer processor within the printing device and the data input by the user is similarly processed. This places additional burdens on the printer processor that is tasked with other responsibilities including operating all the physical components that perform scanning, printing, finishing, etc. Additionally, updating the user interface is time consuming and difficult because updates need to be made consistent with the printer processors limitations. This generally limits the ability to constantly improve the user experience, especially for legacy equipment.

SUMMARY

Various printing devices disclosed herein include, among other components, a printer power supply connected to a printer processor and printing components within the body of the printing devices. A tablet interface device is external to the body of the printing device and is connected to the printer processor and the printer power supply. A mount structure on an exterior of the body is also connected to the printer processor, the printer power supply, and the tablet interface device.

The tablet interface device has a tablet processor within the interior of the tablet interface device. The tablet processor is adapted to operate independently of the printer processor by independently communicating with other devices external to the printing device and independently processing data without using processing resources of the printer processor. However, in some situations the tablet processor can work with the printer processor to share processing resources. For example, the tablet processor is adapted to execute applications that the printer processor is incapable of executing.

The tablet interface device also has a USB connection extending through the tablet exterior. The USB connection is electrically connected to the tablet processor and the printer power supply and the USB connection of the tablet interface device supplies both data and power to the tablet interface device. Further, the USB connection of the tablet interface device is the only electrical and communication connection between the tablet interface device and the printing device.

A touchscreen surface forms a part of the tablet exterior. The touchscreen surface is electrically connected to the tablet processor. An exterior button is also on the tablet exterior. The exterior button is electrically connected to the tablet processor. The exterior button is adjacent the touchscreen surface and can have an LED backlight. Additionally, the tablet interface device can include a camera and/or speakers electrically connected to the tablet processor. The camera is adjacent the touchscreen surface and the speakers can be at any location that allows sound from them to be heard outside the tablet interface device.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

As mentioned above, user interface functions of printers place additional burdens on the printer's processor that is tasked with other responsibilities including operating all the physical components that perform scanning, printing, finishing, etc. Additionally, use of the printer's printer processor generally limits the ability to constantly improve the user experience with the user interface, especially for legacy equipment.

Therefore, the systems and methods herein provide a processing-independent tablet interface for printing devices. The tablet interface described herein includes its own tablet processor, tablet memory, tablet input/output connections, etc., allowing the tablet interface to operate fully independently from the printer processor of the printing device. This expands the functionality of the printing device that is offered to the users. Because the tablet interface is independent, it can be constantly updated to run new apps to control all aspects of the printing device and provide processing functions outside the functions of the printing device. For example, this independence also allows the tablet interface to integrate the functionality of a dedicated microphone and speakers to allow speech communication; use the functionality of a camera to perform gesture recognition, and user recognition (facial recognition) to improve the user experience and enhance security; use the functionality of near field communication (NFC) devices to easily pair external devices, which can be enhanced by sound recognition; etc.

The features of the tablet interface allow legacy equipment to be updated simply with the substitution of the tablet interface for any existing previous interface. Additionally, the tablet's processor can handle all image capture, image processing, sending/receiving of data from other devices, leaving just component controls and print job processing functions to the printer processor of the printing device. Further, the tablet processor can assist with the primary printing functions of the printer processor of the printing device when needed to share processing resources between the two processors.

Figure 1:
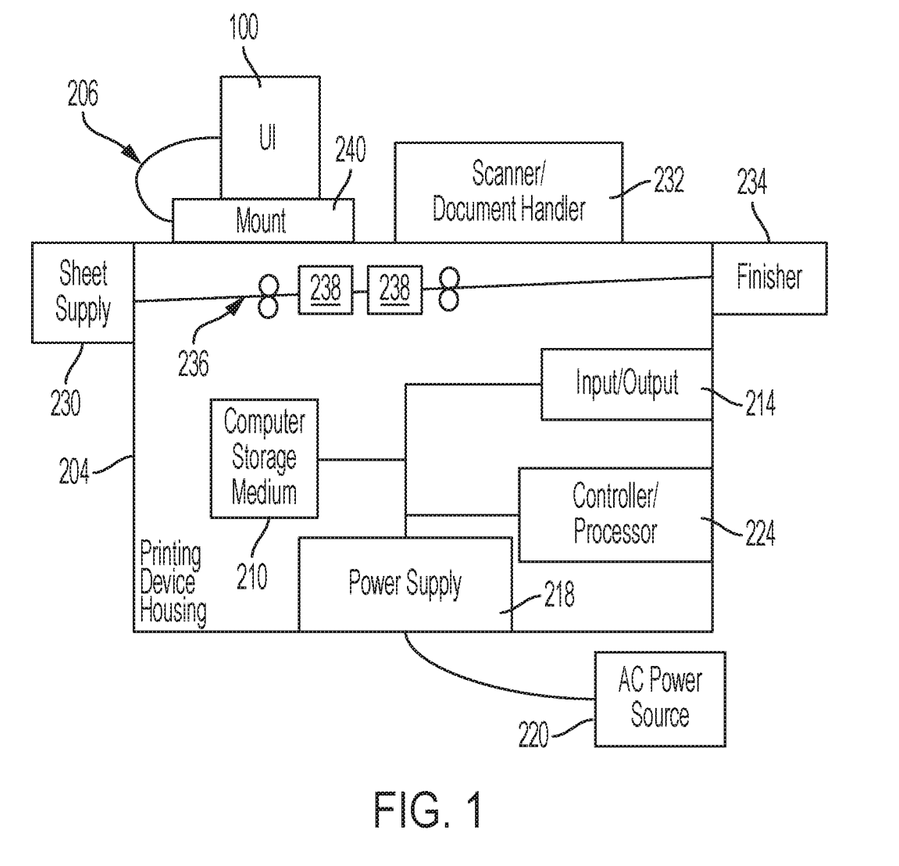
FIG. 1 is a conceptual diagram illustrating printing devices herein.

In greater detail, FIG. 1 illustrates many components of printer structures 204 herein that can comprise, for example, a printer, copier, multi-function machine, multi-function device (MFD), printing kiosk, etc. The printing device 204 includes a controller/tangible printer processor 224 (e.g., integrated circuit (IC) chip) and a communications port (input/output) 214 operatively connected to the tangible printer processor 224 and to a computerized network external to the printing device 204. Also, the printing device 204 can include at least one accessory functional component, such as a user interface (UI) assembly 100. The user may receive messages, instructions, and menu options from, and enter instructions through, the user interface or control panel 100.

The input/output device 214 is used for communications to and from the printing device 204 and comprises a wired device or wireless device (of any form, whether currently known or developed in the future). The tangible printer processor 224 controls the various actions of the printing device 204. A non-transitory, tangible, computer storage medium device 210 (which can be optical, magnetic, capacitor based, etc., and is different from a transitory signal) is readable by the tangible printer processor 224 and stores instructions that the tangible printer processor 224 executes to allow the computerized device to perform its various functions, such as those described herein. Thus, as shown in FIG. 1, a body housing has one or more functional components that operate on power supplied from an alternating current (AC) source 220 by the power supply 218. The power supply 218 can comprise a common power conversion unit, power storage element (e.g., a battery, etc), etc.

The printing device 204 includes at least one marking device (printing engine(s)) 238 that use marking material, and are operatively connected to a specialized image printer processor 224 (that is different from a general purpose computer because it is specialized for processing image data), a media path 236 positioned to supply continuous media or sheets of media from a sheet supply 230 to the marking device(s) 238, etc. After receiving various markings from the printing engine(s) 238, the sheets of media can optionally pass to a finisher 234 which can fold, staple, sort, etc., the various printed sheets. Also, the printing device 204 can include at least one accessory functional component (such as a scanner/document handler 232 (automatic document feeder (ADF)), etc.) that also operate on the power supplied from the external power source 220 (through the power supply 218).

The one or more printing engines 238 are intended to illustrate any marking device that applies marking material (toner, inks, plastics, organic material, etc.) to continuous media, sheets of media, fixed platforms, etc., in two- or three-dimensional printing processes, whether currently known or developed in the future. The printing engines 238 can include, for example, devices that use electrostatic toner printers, inkjet printheads, contact printheads, three-dimensional printers, etc. The one or more printing engines 238 can include, for example, devices that use a photoreceptor belt or an intermediate transfer belt or devices that print directly to print media (e.g., inkjet printers, ribbon-based contact printers, etc.).

Additionally, a tablet interface device 100 is external to the body of the printing device and is connected to the printer processor 224 and the printer power supply 218 via a USB cable 206. A mount structure 240 on the exterior of the body of the printing device 204 is also connected to the printer processor 224, the printer power supply 218, and the tablet interface device 100 (some connections not shown in drawings to avoid clutter).

Figure 2:
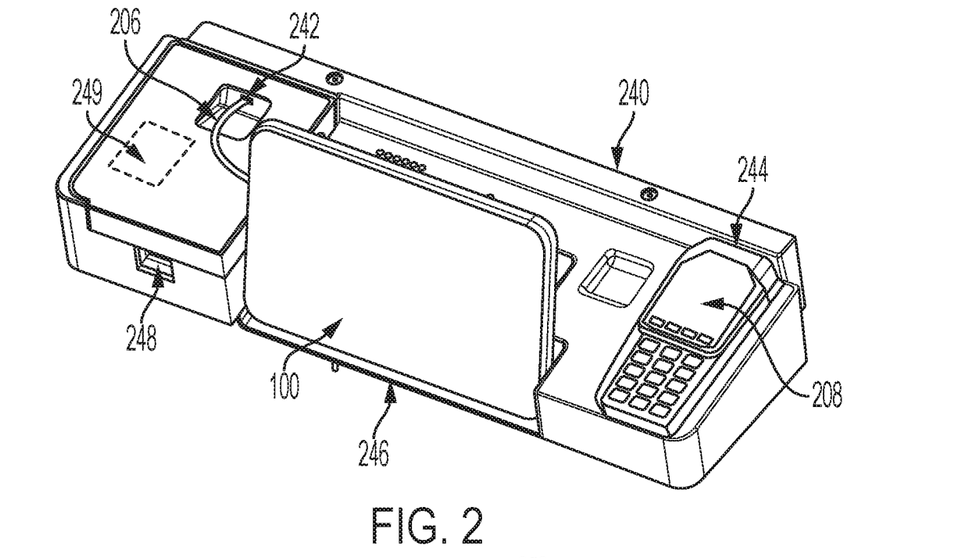
FIG. 2 is a perspective view conceptual diagram illustrating a mount and user interface of printing devices herein.

FIG. 2 shows, in perspective view, the tablet interface device 100 mounted within the mount 240. Specifically, the mount 240 includes a tablet mounting structure 246 that is shaped to accommodate and hold the tablet interface device 100. The tablet mounting structure 246 contains clips, screw holes, bolts, etc. that can permanently hold the tablet interface device 100 in the tablet mounting structure 246. Additionally, as shown in FIG. 2, the mount 240 includes a USB mount connector 242 to which the USB cable 206 connects and a user-device receiver 244 that is shaped and adapted to connect a user's smart device 208. Further, accessory devices such as optical bar code/QR code readers, contact/non-contact credit card readers, etc. (all of which are represented by item 248) can be included as part of the mount 240.

Also, a USB interconnector or hub 249 can be included internally within the mount 240 (note that broken lines are used to represent the USB hub 249 to indicate its internal position within the mount 240). The USB hub 249 can interconnect all devices within and on the mount 240 including the tablet interface device 100, the smart device 208, the readers 248, and other items. Including the USB hub 249 within the mount 240 allows the mount 240 to be a self-contained independent module that can be added to any existing printing device. Such a self-contained independent mount 240 would only use a few wiring connections (e.g., connections to the printer's power supply 218, connections to the printer's processor 224, etc.) which permits the self-contained independent mount 240 to be quickly and easily added to any existing printing device so as to dramatically increase the functionality of such a device, especially from a user-interaction perspective.

Figure 3:
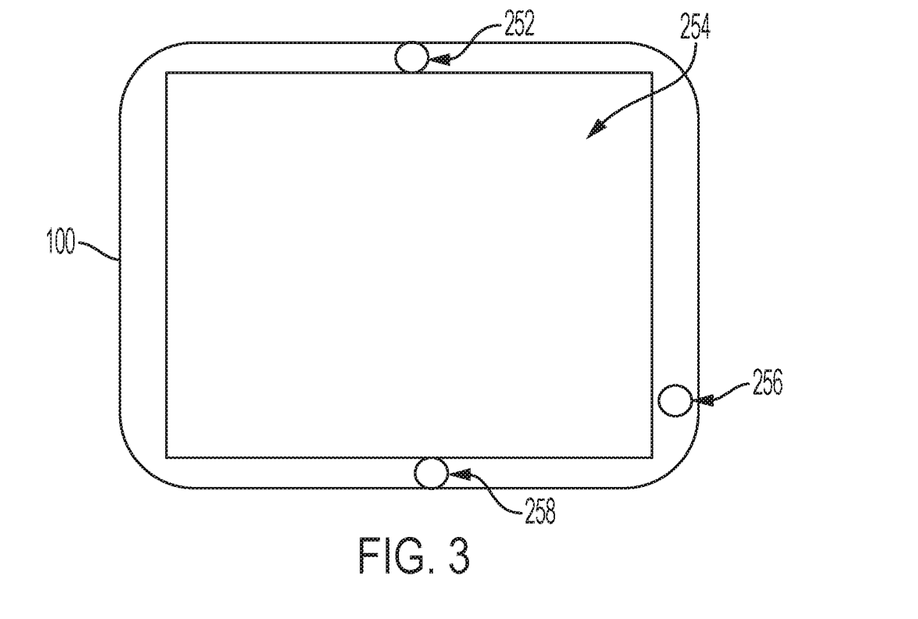
FIG. 3 is a front view conceptual diagram illustrating a user interface of printing devices herein.

FIG. 3 is a front view of just the tablet interface device 100. FIG. 3 shows that the tablet interface device 100 can include a camera 252, a touchscreen 254, a button 256, and a microphone 258. As can be seen in FIG. 3, the touchscreen 254 surface forms a part of the exterior of the tablet interface device 100. The exterior button 256 is adjacent the touchscreen 254 surface and can have an LED backlight. The camera 252 and microphone 258 are also adjacent the touchscreen 254 surface.

Figure 4:
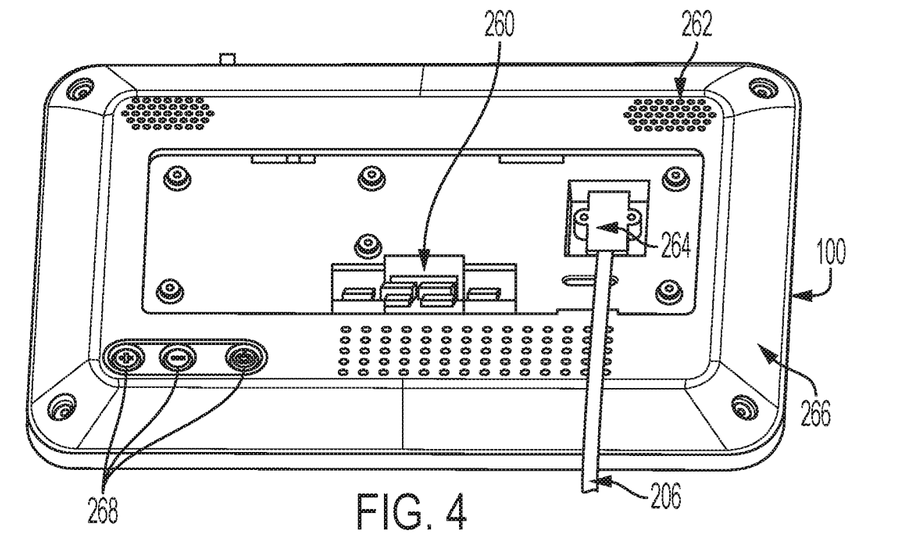
FIGS. 4-5 are perspective back view conceptual diagrams illustrating a user interface of printing devices herein.

FIG. 4 is a back view of the tablet interface device 100 and shows the back cover 266 of the tablet interface device 100. FIG. 4 shows a clearance cut away 260 in the back cover 266 for a hinge swivel point. A secure card (SC) port can be located, for example, behind a cover on one of the sides of the tablet interface device 100. FIG. 4 also shows that the back of the tablet interface device 100 includes speaker grills 262 behind which are located speakers. The speakers can be at any location that allows sound from them to be heard outside the tablet interface device 100.

Further, FIG. 4 illustrates a USB tablet connector 264 to which the USB cable 206 connects. The USB cable 206 supplies both data and power connections to the tablet interface device 100 and is the only electrical connection between the printing device 204 and the tablet interface device 100. Additionally, control buttons 268 are shown in FIG. 4. The control buttons 268 are used to adjust volume, power, etc.

Figure 5:
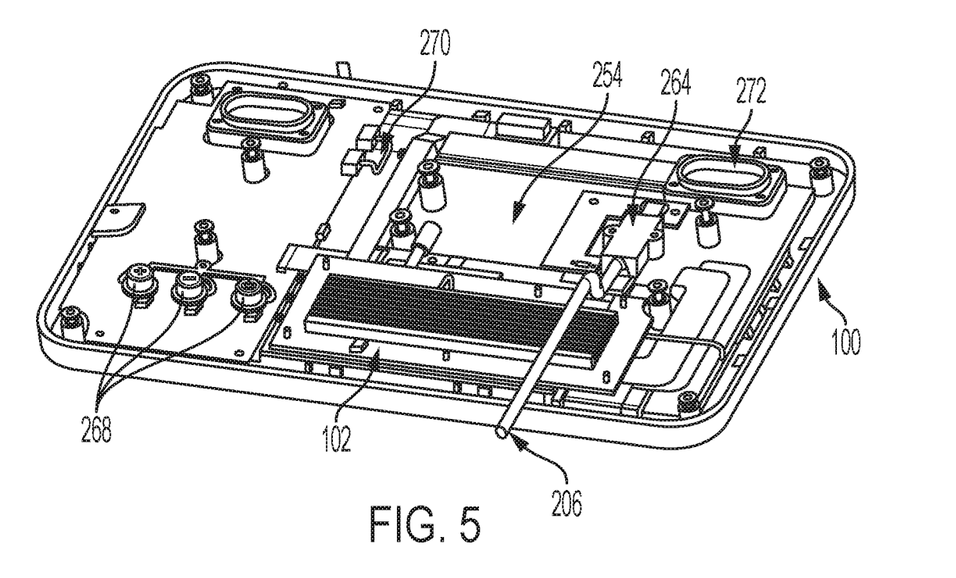

FIG. 5 also shows a back view of the tablet interface device 100; however, in contrast with FIG. 4, FIG. 5 shows the back of the tablet interface device 100 with the back cover 266 removed. Therefore, the view in FIG. 5 exposes some of the components within the interior of the tablet interface device 100, such as the speakers 272 that sit behind the grills 262, and the back of the touchscreen 254. FIGS. 4 and 5 also show that the USB tablet connector 264 extends through the back cover 266.

Additionally, FIG. 5 shows that the tablet interface device 100 has a tablet processor 102 within the interior of the tablet interface device 100. The touchscreen 254 is electrically connected to the tablet processor 102 by various wiring 270. Additional wiring (not visible in the view shown in FIG. 5) connects the speakers 272, button 256, camera 252, microphone 258, NFC antenna, etc., to the tablet processor 102.

Figure 6:
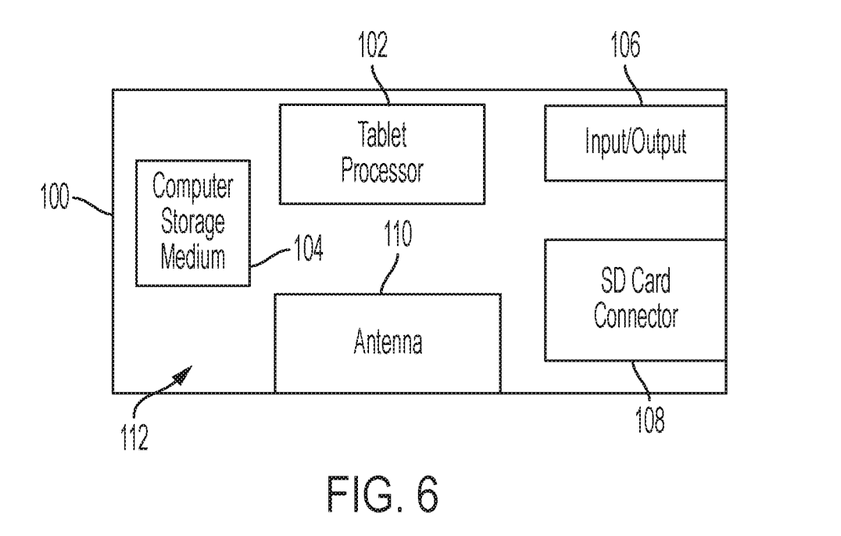
FIG. 6 is a conceptual diagram illustrating a motherboard of user interfaces of printing devices herein.

FIG. 6 illustrates one example of some components that could be mounted on or electrically connected to a motherboard 112 within the tablet in order to place items in electrical communications with one another. Such devices include, for example, the tablet processor 102 (e.g., IC chip), computer storage medium 104 (which can be similar to the computer memory 210 discussed above), input/output device 106, SD card reader connector 108, antenna 110, etc. Various wiring on or within the motherboard 112 interconnects such devices. The antenna 110 shown can be one or more antennae that permit wireless communication to other devices, such as the printer processor 224 of the printing device, user's smart devices (e.g., item 208 in FIG. 2), wireless internet connections, NFC wireless connectivity, etc. The input/output 106 is connected to all the components of the tablet interface device 100 noted above and is connectable to other components external to the tablet interface device 100.

The tablet processor 102 is adapted to operate independently of the printer processor 224. In one example, the tablet processor 102 can independently communicate with other devices external to the printing device 204 and independently process data without using processing resources of the printer processor 224. In another example, the tablet processor 102 is adapted to execute applications that the printer processor 224 is incapable of executing. Also, the tablet processor 102 can assist with the primary printing functions of the printer processor 224 when needed to share processing resources between the two processors.

Thus, all elements within the tablet interface device 100 are adapted to operate independently of the elements in the printing device 204, although it may be advantageous to utilize the power supply 218 of the printing device as the only power source of the tablet interface device 100, for heat and energy consumption efficiency. This permits the tablet interface device 100 to expand the functionality of the printing device that is offered to the users.

In some examples, the computer storage medium 104 can store computer programs or "apps" that can be executed by the tablet processor 102, and the printer processor 224 of the printing device 204 may not be capable of executing such apps. Such apps can control all aspects of the printing device 204 but can also integrate the functionality of the microphone 258 and speakers 272 to allow speech communication with a user. Further, these apps can use the functionality of the camera 252 to perform gesture recognition. Additionally, the functionality of the camera 252 can provide user recognition (facial recognition) to improve the user experience (avoiding having the user supply passwords, etc.) and can similarly use such user recognition to enhance security by verifying a user before releasing a secure print job or tracking who used the printing device 204.

The features of the tablet interface device 100 allow legacy equipment to be updated simply with the substitution of the tablet interface device 100 in place of a conventional interface. The tablet processor 102 is highly complex and supports dynamic operating systems, such as Android OS. Android is an operating system based on a modified version of the Linux kernel and other open source software, designed primarily for touchscreen devices such as tablets. Android is developed by a consortium of developers known as the Open Handset Alliance and commercially sponsored by Google LLC, Mountain View, Calif.

For example, Android OS can run video on the tablet interface device 100 and can support several other interfaces like wireless fidelity (Wi-Fi), NFC and audio. In contrast, conventional interfaces do not have such features and conventional interfaces rely upon the printer processor 224 for all processing functions. Also, conventional interfaces do not have usable internal storage; however, the computer storage medium 104 of the tablet interface device 100 disclosed herein allows the tablet interface device 100 to store various items, such as logs that can be extracted to assist with troubleshooting, etc.

Further, the tablet processor 102 can assist with the primary printing functions of the printer processor 224 of the printing device 204 when needed. In one example, if a print job requires a significant amount of raster image processing, the tablet processor 102 can monitor the progress being made by the printer processor 224 of the printing device 204 and take over or supplement some pre-print processing calculations when needed.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible printer processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible printer processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user. Additionally, terms such as "adapted to" mean that a device is specifically designed to have specialized internal or external components that automatically perform a specific operation or function at a specific point in the processing described herein, where such specialized components are physically shaped and positioned to perform the specified operation/function at the processing point indicated herein (potentially without any operator input or action). In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A printing device comprising:
a printer power supply;
a printer processor connected to the printer power supply;
printing components connected to the printer power supply and the printer processor; and
a tablet interface device connected to the printer processor and the printer power supply, wherein the tablet interface device comprises:
a tablet processor;
a USB connection electrically connected to the tablet processor and the printer power supply, wherein the USB connection of the tablet interface device is the only electrical and communication connection between the tablet interface device and the printing device; and
a touchscreen surface electrically connected to the tablet processor, and wherein the tablet processor is adapted to operate independently of the printer processor.

2. The printing device according to claim 1, wherein the tablet processor is adapted to execute applications that the printer processor is incapable of executing.

3. The printing device according to claim 1, wherein the tablet interface device comprises a camera electrically connected to the tablet processor, wherein the camera is adjacent the touchscreen surface.

4. The printing device according to claim 1, wherein the tablet interface device comprises a speaker electrically connected to the tablet processor.

5. The printing device according to claim 1, wherein the USB connection of the tablet interface device supplies data and power to the tablet interface device.

6. The printing device according to claim 1, wherein the tablet interface device comprises an exterior button having an LED backlight.

7. A printing device comprising:
a body;
a printer power supply within the body;
a printer processor within the body and connected to the printer power supply;
printing components within the body and connected to the printer power supply and the printer processor; and
a tablet interface device external to the body and connected to the printer processor and the printer power supply, wherein the tablet interface device comprises:
a tablet processor;
a USB connection electrically connected to the tablet processor and the printer power supply, wherein the USB connection of the tablet interface device is the only electrical and communication connection between the tablet interface device and the printing device; and
a touchscreen surface electrically connected to the tablet processor, and
wherein the tablet processor is adapted to operate independently of the printer processor by independently communicating with other devices external to the printing device and independently processing data without using processing resources of the printer processor.

8. The printing device according to claim 7, wherein the tablet processor is adapted to execute applications that the printer processor is incapable of executing.

9. The printing device according to claim 7, wherein the tablet interface device comprises a camera electrically connected to the tablet processor, wherein the camera is adjacent the touchscreen surface.

10. The printing device according to claim 7, wherein the tablet interface device comprises a speaker electrically connected to the tablet processor.

11. The printing device according to claim 7, wherein the USB connection of the tablet interface device supplies data and power to the tablet interface device.

12. The printing device according to claim 7, wherein the tablet interface device comprises an exterior button having an LED backlight.

13. A printing device comprising:
a body;
a printer power supply within the body;
a printer processor within the body and connected to the printer power supply;
printing components within the body and connected to the printer power supply and the printer processor;
a tablet interface device external to the body and connected to the printer processor and the printer power supply; and
a mount structure on an exterior of the body and connected to the printer processor, the printer power supply, and the tablet interface device,
wherein the tablet interface device comprises:
a tablet exterior;
a tablet processor within the tablet exterior;
a USB connection extending through the tablet exterior, wherein the USB connection is electrically connected to the tablet processor and the printer power supply, and wherein the USB connection of the tablet interface device is the only electrical and communication connection between the tablet interface device and the printing device; and
a touchscreen surface forming a part of the tablet exterior, wherein the touchscreen surface is electrically connected to the tablet processor, and
wherein the tablet processor is adapted to operate independently of the printer processor by independently communicating with other devices external to the printing device and independently processing data without using processing resources of the printer processor.

14. The printing device according to claim 13, wherein the tablet processor is adapted to execute applications that the printer processor is incapable of executing.

15. The printing device according to claim 13, wherein the tablet interface device comprises a camera electrically connected to the tablet processor, wherein the camera is adjacent the touchscreen surface.

16. The printing device according to claim 13, wherein the tablet interface device comprises a speaker electrically connected to the tablet processor.

17. The printing device according to claim 13, wherein the USB connection of the tablet interface device supplies data and power to the tablet interface device.

* * * * *